United States Patent Office 3,511,358
Patented May 12, 1970

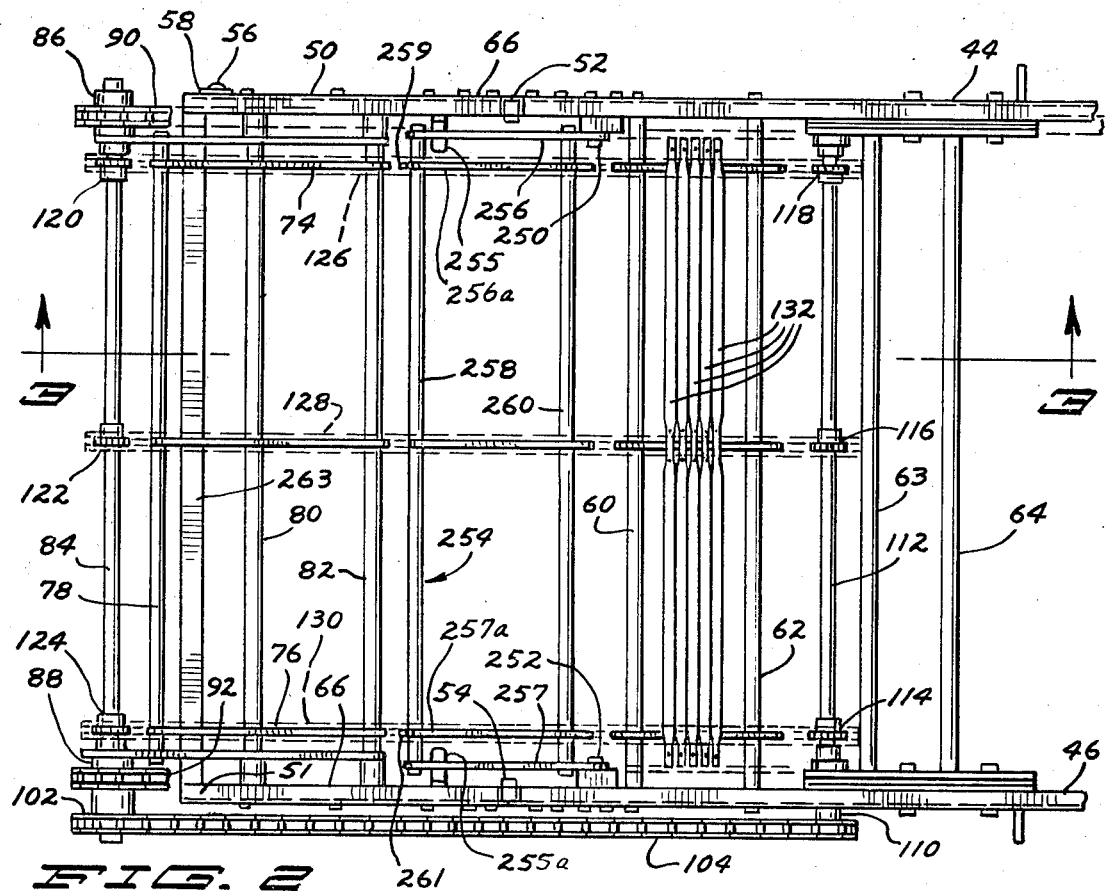
FIG. 2
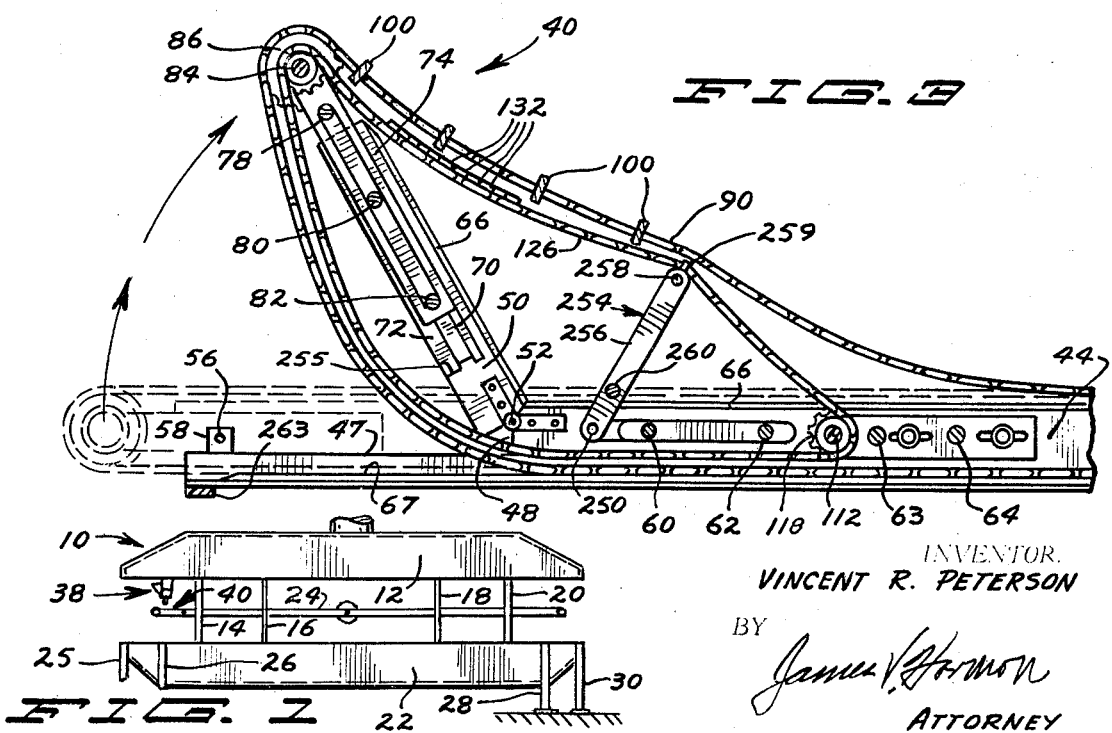
FIG. 3
FIG. 1
INVENTOR.
VINCENT R. PETERSON
BY
*James V. Harmon*
ATTORNEY

3,511,358
SANITARY QUICK OPENING DROP PLATE
CONVEYOR FOR BAKERY GOODS
Vincent R. Peterson, Minneapolis, Minn., assignor to The Pillsbury Company, Minneapolis, Minn., a corporation of Delaware
Filed June 4, 1968, Ser. No. 734,306
Int. Cl. B65g 21/00
U.S. Cl. 198—119                    5 Claims

ABSTRACT OF THE DISCLOSURE

An endless flexible slat conveyor adapted to form a flat supporting surface upon which bakery products are dropped. The conveyor is composed of parallel shafts over which conveyor chains are entrained. The shafts are supported on an articulated framework that allows one shaft to swing upwardly and thereby move toward the other shaft thus causing the upper and lower reaches of the conveyor to become slack. A spreading assembly is raised by hand to lift up the top reach of the conveyor away from the lower reach so that its inside can be readily cleaned, inspected or repaired.

---

The present invention relates to bakery processing conveyors and more particularly to a slat conveyor adapted to form a supporting surface upon which bakery goods can be dropped.

When bakery products such as doughnuts, Bismarcks, long johns or similar products are dropped into hot fat they sink at first unless supported. A horizontally disposed flat metal plate has been used to temporarily support the doughnuts or other products until made buoyant by the gas generated in the leavening reaction within the product.

However, the friction against the bottom of the doughnut as it is advanced across the drop plate by the main bar conveyor can cause the doughnuts to be broken, mishaped or otherwise damaged.

In view of these and other shortcomings of the prior art it is one object of the present invention to provide an improved drop plate conveyor adapted to advance bakery goods at the same speed as a main advancing conveyor and provide a moving support for the products dropped thereon with a provision for easily and quickly opening the drop plate conveyor to provide ready access to the interior thereof for cleaning or inspection.

Another object of the invention is the provision of an improved drop plate conveyor of the type described wherein the drop plate conveyor can be opened manually by removing a single fastener.

Another object of the invention is the provision of an improved drop plate conveyor of the type described with a provision for reliably holding the drop plate conveyor in an open position.

A still further object of the invention is the provision of an improved drop plate conveyor with a provision for holding the conveyor open and for maintaining a portion of the conveyor in an elevated position.

These and other more detailed and specific objects will become apparent in view of the following specification and drawings wherein:

FIG. 1 is a side elevational view of a fryer embodying the invention.

FIG. 2 is a plan view of the left end of the conveyor shown in FIG. 1 on a greatly enlarged scale.

FIG. 3 is a vertical longitudinal sectional view taken on line 3—3 of FIG. 2.

The invention will now be described in connection with a doughnut fryer. It should be understood, however, that the invention can be used for other food conveying applications.

As seen in FIG. 1 the doughnut fryer 10 consists of a hood 12 supported upon columns 14, 16, 18 and 20 above a frying vessel 22 containing heated shortening that is used for frying doughnuts or other pastry products. Positioned above the vessel 22 is a main doughnut advancing conveyor 24. The conveyor 24 is mounted upon an elevating mechanism (not shown) for raising it to the position shown in FIG. 1 or lowering it into the shortening when it is in use.

The cooking vessel 22 is supported by a framework composed of columns, only four of which, 25, 26, 28 and 30, are shown. Above the left end of the main conveyor 24 is a doughnut depositor 38 of suitable known construction. The doughnut depositor is ordinarily mounted on a supporting framework (not shown) that can be rolled into the position shown in FIG. 1 or removed as required. Other means can, if desired, be used for placing the product into the vessel 22. The portion of the main conveyor 24 beneath the doughnut depositor 38 has been designated 40 and it is this portion of the conveyor that includes the drop plate conveyor with which the present invention is concerned.

The main conveyor 24 is composed of two laterally spaced longitudinally extending frame members 44 and 46 (FIGS. 2 and 3). The left end portions of the frame members have been cut horizontally along lines 47 and vertically along lines 48 to provide separate articulated end sections 50 and 51 which are pivotally secured to the frame members 44 and 46 by means of pivots 52 and 54 respectively. A stabilizer bar 263 is secured rigidly to the free ends of the main frame members 44 and 46.

A screw 56 that extends through a bracket 58 is used to secure the articulated portion of the framework in its normal position (the dotted line position of FIG. 3).

Spacing between the main frame members 44 and 46 is maintained by means of tie rods 60, 62, 63 and 64 suitably rigidly secured at their ends to the frame members. Rigidly affixed to the upper surface of the frame members 44 and 46 is a chain track, all parts of which are designated 66. Another chain track designated 67 is suitably affixed to the lower portion of each of the frame members 44 and 46 as can be seen in FIG. 3.

Suitably rigidly secured to the inside surface of each of the end sections 50 and 51 are guides composed of upper and lower bars 70 and 72 respectively (only those on section 50 being shown in FIG. 3) between which are slidably mounted for movement on a longitudinal axis a conveyor tightener assembly composed of parallel bars 74 and 76 rigidly connected together by means of tie rods 78, 80 and 82. The bars 74 and 76 are forced toward the left in the figures and locked in place within the guides to tighten the main advancing conveyor chains.

Suitably journalled for rotation between the ends of the bars 74 and 76 is a chain sprocket shaft 84 upon which sprockets 86 and 88 are free to rotate. Entrained over the sprockets 86 and 88 are the main conveyor chains 90 and 92. Connected between the conveyor chains 90 and 92 are a plurality of transversely extending longitudinally spaced bars 100 (four of which are shown in FIG. 3) for the purpose of advancing the floating doughnuts or other bakery products through the hot fat when the fryer is in operation. It should be understood that a plurality of the bars 100 are provided at uniformly spaced intervals throughout the entire length of chains 90 and 92.

Rigidly secured to the sprocket 88 is a sprocket 102 from which an endless roller chain 104 extends toward the right in the figures and is entrained at its other end over a drop plate conveyor drive sprocket 110. It should be noticed that the sprocket 110 is smaller than sprocket 102. In this way the linear speed of the drop plate conveyor will match the linear speed of the main conveyor chains 90 and 92.

The sprocket 110 is secured rigidly to a shaft 112 journalled between frame members 44 and 46. Affixed to shaft 112 are three sprockets 114, 116 and 118. Intrained between these sprockets and three sprockets 120, 122 and 124 all mounted on shaft 84 are longitudinally extending roller chains 126, 128 and 130. Secured between these chains are laterally extending slats 132, only a few of which are shown. The slats are spaced close enough together (a 1/16 inch spacing between adjacent slats is satisfactory) to provide a normally disposed surface for supporting the doughnuts as they are expelled from the doughnut depositor 38.

Pivotally mounted upon pins 250 and 252 is a spreader 254 composed of longitudinally extending bars 256 and 257 secured rigidly together by means of tie rods 258 and 260 to which are secured bars 256a and 257a. On the free end of each of the bars 256a and 257a are projections designated 259 and 261. Brackets 255 and 255a secured to the frame members 44 and 46 respectively support the free end of the spreader when in the position shown in FIG. 2.

The screw 56 after being removed allows the free end of the main conveyor 24 and drop plate conveyor to be pivoted upwardly about the pivots 52 and 54 thereby allowing the upper and lower reaches of the drop plate conveyor to spread apart as seen in FIG. 3. When this has been done, the spreader assembly 254 is raised by hand to the position of FIG. 3.

When the spreader assembly 254 has been raised, the projections 259 and 261 are inserted in the openings between the rollers of chains 126 and 130 respectively. In this manner the roller chains are supported so as to retain the drop plate conveyor in an open position as seen in FIG. 3. In this way ready access is provided to the inside of the conveyor for cleaning, inspection and repair. It should also be seen that the spreader assembly 254 acts to support the free end of the articulated frame members 50 and 51. Thus, the spreader assembly 254 serves two functions; it holds the drop plate conveyor in the open position as well as maintaining the free end of the framework in the elevated position. The articulation of the free end of the supporting framework about the pivots 52 and 54 can be thought of as a means for bringing the shafts 84 and 112 of the drop plate conveyor toward one another.

The operation of the apparatus will now be described. To begin the operation, the main advancing conveyor 24 is lowered from the position of FIG. 1 into the upper portion of the vessel 22. The upper reach conveyor 24 is then driven from left to right in the figures by a motor (not shown). The chain 92 will of course turn the sprocket 102, the chain 104, drop plate conveyor drive sprocket 110, shaft 112 and chains 126, 128 and 130 of the drop plate conveyor. The doughnut depositor 38 is then placed in position and started. The doughnuts will be dropped onto the slats 132 of the drop plate conveyor at the proper time to fall between the cross bars 100.

When the drop plate conveyor is to be cleaned or inspected, the main doughnut advancing conveyor 24 must be raised from vessel 22 to the position of FIG. 1. The screw 56 is removed and the free end of the frame members 50 and 51 is raised. The spreader 254 is then raised to the position of FIG. 3 and the projections 259 and 261 are inserted into the openings between rollers of the roller chain as shown.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A quick opening sanitary moving drop plate conveyor comprising in combination a supporting framework, an endless conveyor assembly mounted on the framework, said endless conveyor assembly including an endless supporting surface, parallel shafts supporting the ends of the drop plate conveyor, one of the shafts being movable relative to the other shaft along a path between the shafts to thereby allow changes to be made in the spacing therebetween to enable the upper and lower reaches of the drop plate conveyor to be separated from one another and a spreader assembly operatively associated between the upper and lower reaches of the drop plate conveyor for spreading the upper reach of the drop plate conveyor from the lower reach thereof when the shafts are brought toward one another.

2. A sanitary quick opening moving drop plate conveyor comprising in combination a supporting framework having a main frame assembly and an articulated portion at the end of the main frame assembly, a pivotal connection between the main frame assembly and the articulated portion for allowing the articulated frame portion to swing relative to the main frame assembly, a drop plate conveyor including a first sprocket shaft mounted upon the main frame assembly, a second sprocket shaft mounted upon the free end of the articulated portion of the conveyor frame and a spreader assembly mounted on the framework between the first and second shafts for raising the upper reach of the drop plate conveyor and an endless supporting surface entrained between the shafts.

3. The apparatus of claim 1 wherein one of the shafts is mounted upon a supplementary frame assembly articulated for up and down swinging movement about a horizontal axis relative to the other shaft whereby the spacing between the shafts can be changed as required by raising and lowering the free end of the articulated supplementary frame assembly.

4. The apparatus of claim 1 wherein the spreader assembly comprises lifting a member connected to said supporting framework for pivotal movement about a horizontal axis whereby the free end of the lifting member can be elevated to a position engaging the lower surface of the upper reach of the drop plate conveyor to support the same when the inside thereof is to be inspected, repaired or cleaned.

5. The apparatus of claim 4 wherein the drop plate conveyor includes longitudinally spaced openings and projections provided on the free ends of the spreader assembly and are adapted to extend into the openings of the drop plate conveyor.

References Cited

UNITED STATES PATENTS 3,283,695  11/1966  Belshaw et al. _____ 99—354
3,302,770   2/1967  Schwalm _____ 198—109

ANDRES H. NEILSEN, Primary Examiner